(12) United States Patent
Schmidt

(10) Patent No.: US 9,549,178 B2
(45) Date of Patent: Jan. 17, 2017

(54) SEGMENTING AND TRANSCODING OF VIDEO AND/OR AUDIO DATA

(71) Applicant: Verizon Patent and Licensing Inc., Basking Ridge, NJ (US)

(72) Inventor: Johannes P. Schmidt, Los Altos Hills, CA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 555 days.

(21) Appl. No.: 13/727,516

(22) Filed: Dec. 26, 2012

(65) Prior Publication Data
US 2014/0177700 A1 Jun. 26, 2014

(51) Int. Cl.
*H04N 19/40* (2014.01)
(52) U.S. Cl.
CPC ........ *H04N 19/00472* (2013.01); *H04N 19/40* (2014.11)
(58) Field of Classification Search
CPC ..... H04N 7/26; H04N 19/00472; H04N 19/40
See application file for complete search history.

(56) References Cited

U.S. PATENT DOCUMENTS

| | | | |
|---|---|---|---|
| 2005/0232232 A1* | 10/2005 | Farber | H04W 88/181 370/352 |
| 2007/0150271 A1 | 6/2007 | Virette et al. | |
| 2008/0097763 A1 | 4/2008 | Van De Par et al. | |
| 2008/0162713 A1* | 7/2008 | Bowra et al. | 709/231 |
| 2009/0274212 A1* | 11/2009 | Mizutani et al. | 375/240.12 |
| 2011/0276712 A1* | 11/2011 | Narula et al. | 709/231 |
| 2011/0299601 A1* | 12/2011 | Lai et al. | 375/240.25 |
| 2012/0281748 A1* | 11/2012 | Peng | H04N 19/149 375/240.01 |
| 2012/0300015 A1* | 11/2012 | Chen et al. | 348/14.08 |

* cited by examiner

*Primary Examiner* — Thai Tran
*Assistant Examiner* — Christopher T Braniff

(57) ABSTRACT

In various embodiments, an encoder may be configured to divide received content in a first format into one or more segments and then to transcode the previously-divided segments into other formats and/or bitrates for presentation. In various embodiments, the encoder may include multiple segmenting computing devices configured to perform the dividing of the content into segments. The encoder may also include multiple transcoding computing devices configured to transcode the divided segments into a format for presentation. In various embodiments, the computing devices may be configured to communicate with each other via a network to determine which content has been divided into segments and which divided segments have been transcoded. The determination may be performed autonomously by the devices. Thus, in various embodiments, the devices included in the encoder may be configured to perform segmenting and transcoding on a distributed basis without necessarily requiring coordination by any one device.

27 Claims, 8 Drawing Sheets

SEGMENTING AND TRANSCODING OF VIDEO AND/OR AUDIO DATA

TECHNICAL FIELD

The present disclosure relates to the field of data processing, in particular, to apparatuses, methods and storage medium associated with video encoding and transcoding.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Advances in computing, networking and related technologies have led to proliferation in the availability of multi-media content, and the manners in which the content is consumed. Today, multi-media content may be made available from fixed medium (e.g., Digital Versatile Disk (DVD)), broadcast, cable operators, satellite channels, Internet, and so forth. Users may consume content with a television set, a laptop or desktop computer, a tablet, a smartphone, or other devices of the like. Further, content may be made available in various formats and bitrates in order to support the capabilities of the various consumption technologies that are available to consumers.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Figure 1:
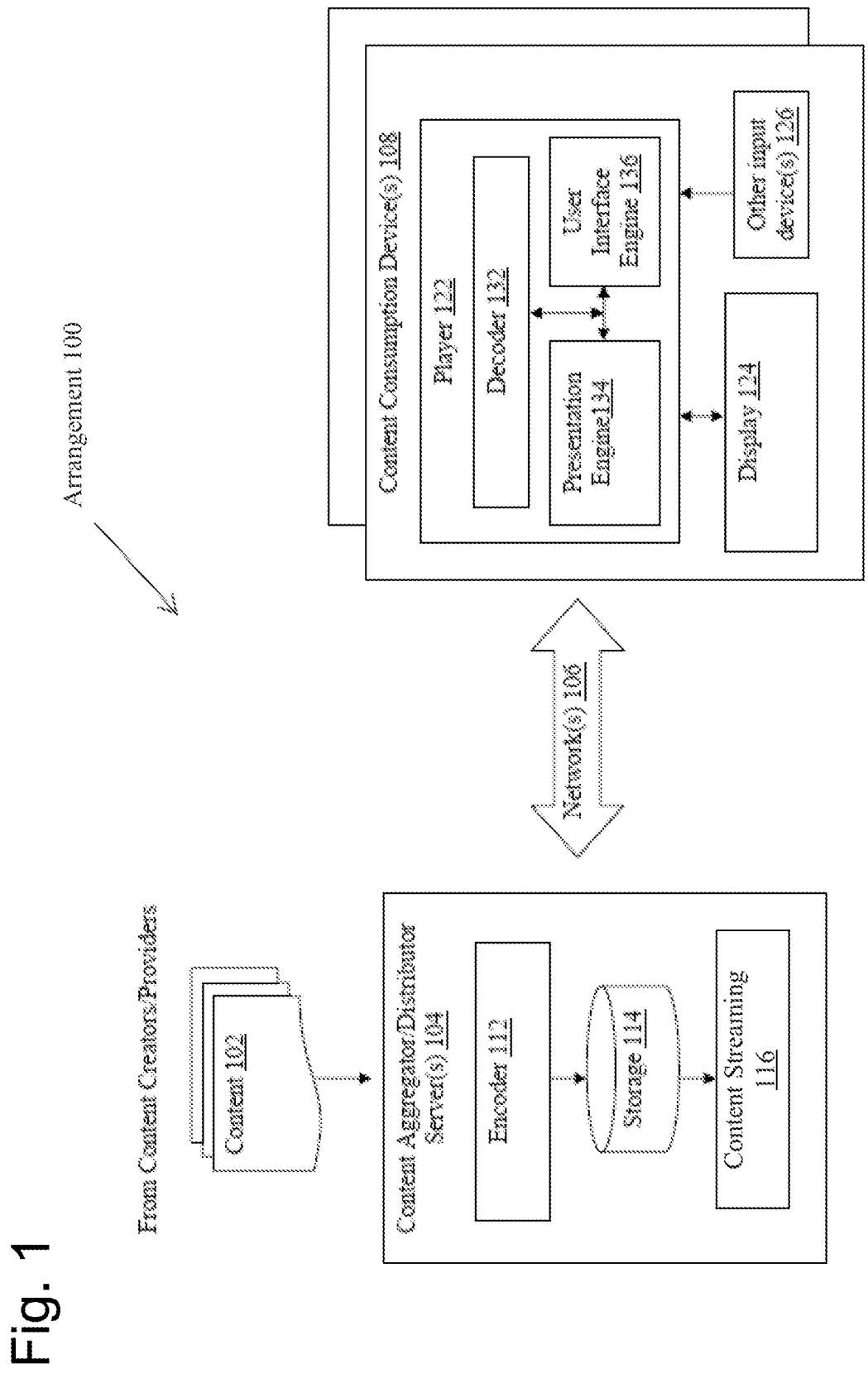
FIG. 1 illustrates an arrangement for content distribution and consumption, in accordance with various embodiments.

Apparatuses, methods and storage medium associated with content distribution and/or consumption are disclosed herein. In embodiments, an encoder may be configured to receive and/or capture content, such as, for example, video content in a first format, and to transcode that content from the first format to one or more formats for subsequent presentation. The encoder may be configured to divide the received content into one or more segments and then to transcode the previously-divided segments for presentation. In various embodiments, the encoder may include multiple segmenting computing devices configured to perform the dividing of the content into segments. The encoder may also include multiple transcoding computing devices configured to transcode the divided segments into a format for presentation. In various embodiments, the encoder may include segmenting/transcoding computing devices which are configured to perform both the segmenting and the transcoding. In various embodiments, the segmenting computing devices, transcoding computing devices, and/or segmenting/transcoding computing devices may be configured to communicate with each other via a network to determine which content has been divided into segments and which divided segments have been transcoded. The determination may be performed autonomously by the devices. Thus, in various embodiments, the devices included in the encoder may be configured to perform segmenting and transcoding on a distributed basis without necessarily requiring coordination by any one device.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit ("ASIC"), an electronic circuit, a processor (shared, dedicated, or group) and/or memory (shared, dedicated, or group) that execute one or more software or firmware programs, a combinational logic circuit, and/or other suitable components that provide the described functionality.

Referring now to FIG. 1, an arrangement for content distribution and consumption, in accordance with various embodiments, is illustrated. As shown, in embodiments, arrangement 100 for distribution and consumption of content may include a number of content consumption devices 108 coupled with one or more content aggregation/distribution servers 104 via one or more networks 106. Content aggregation/distribution servers 104 may be configured to aggregate and distribute content to content consumption devices 108 for consumption, via one or more networks 106. As will be described in more detail below, content aggregation/distribution servers 104 may be incorporated with various teachings of the present disclosure to transcode content 102 for presentation by content consumption devices 108.

In embodiments, as shown, content aggregation/distribution servers 104 may include encoder 112, storage 114 and content provisioning 116, which may be coupled to each other as shown. Encoder 112 may be configured to encode content 102 from various content providers, and storage 114 may be configured to store encoded content. Content provisioning 116 may be configured to selectively retrieve and provide encoded content to the various content consumption devices 108 in response to requests from the various content consumption devices 108.

Content 102 may be multi-media content of various types, having video, audio, and/or closed captions, from a variety of content creators and/or providers. Examples of content may include, but are not limited to, movies. TV programming, user created content (such as YouTube video, iReporter video), music albums/titles/pieces, and so forth. Examples of content creators and/or providers may include, but are not limited to, movie studios/distributors, television programmers, television broadcasters, satellite programming broadcasters, cable operators, online users, and so forth.

In embodiments, for efficiency of operation, encoder 112 may be configured to transcode the various content 102, typically in different encoding formats, into a subset of one or more common encoding formats. However, encoder 112 may be configured to nonetheless maintain indices or cross-references to the corresponding content in their original encoding formats. Similarly, for flexibility of operation, encoder 112 may transcode or otherwise process each or selected ones of content 102 into multiple versions of different quality levels. The different versions may provide different resolutions, different bit rates, and/or different frame rates for transmission and/or playing. In various embodiments, the encoder 112 may publish, or otherwise make available, information on the available different resolutions, different bitrates, and/or different frame rates. For example, the encoder 112 may publish bitrates at which it may provide video or audio content to the content consumption device(s) 108. Encoding of audio data may be performed in accordance with, e.g., but are not limited to, the MP3 standard, promulgated by the Moving Picture Experts Group (MPEG). Encoding of video and/or audio data may be performed in accordance with, e.g., but are not limited to, the H264 standard, promulgated by the International Telecommunication Unit (ITU) Video Coding Experts Group (VCEG). Encoder 112 may include one or more computing devices configured to perform content partitioning, encoding, and/or transcoding, such as described herein.

Storage 114 may be temporal and/or persistent storage of any type, including, but are note limited to, volatile and non-volatile memory, optical, magnetic and/or solid state mass storage, and so forth. Volatile memory may include, but are not limited to, static and/or dynamic random access memory. Non-volatile memory may include, but are not limited to, electrically erasable programmable read-only memory, phase change memory, resistive memory, and so forth.

Content provisioning 116 may, in various embodiments, be configured to provide encoded content as discrete files and/or as continuous streams of encoded content. Content provisioning 116 may be configured to transmit the encoded audio/video data (and closed captions, if provided) in accordance with any one of a number of streaming and/or transmission protocols. The streaming protocols may include, but are not limited to, the Real-Time Streaming Protocol (RTSP). Transmission protocols may include, but are not limited to, the transmission control protocol (TCP), user datagram protocol (UDP), and so forth.

Referring back to FIG. 1, networks 106 may be any combinations of private and/or public, wired and/or wireless, local and/or wide area networks. Private networks may include, e.g., but are not limited to, enterprise networks. Public networks, may include, e.g., but is not limited to the Internet. Wired networks, may include, e.g., but are not limited to, Ethernet networks. Wireless networks, may include, e.g., but are not limited to, Wi-Fi, or 3G/4G networks. It would be appreciated that at the content distribution end, networks 106 may include one or more local area networks with gateways and firewalls, through which servers 104 go through to communicate with content consumption devices 108. Similarly, at the content consumption end, networks 106 may include base stations and/or access points, through which consumption devices 108 communicate with servers 104. In between the two ends may be any number of network routers, switches and other networking equipment of the like. However, for ease of understanding, these gateways, firewalls, routers, switches, base stations, access points and the like are not shown.

In embodiments, as shown, a content consumption device 108 may include player 122, display 124 and user input device 126. Player 122 may be configured to receive streamed content, decode and recovered the content from the content stream, and present the recovered content on display 124, in response to user selections/inputs from user input device 126.

In embodiments, player 122 may include decoder 132, presentation engine 134 and user interface engine 136. Decoder 132 may be configured to receive streamed content, decode and recover the content from the content stream. Presentation engine 134 may be configured to present the recovered content on display 124, in response to user selections/inputs. User interface engine 136 may be configured to receive the user selections/inputs from a user.

While shown as part of a content consumption device 108, display 124 and/or user input device(s) 126 may be stand-alone devices or integrated, for different embodiments of content consumption devices 108. For example, for a television arrangement, display 124 may be a stand alone television set, Liquid Crystal Display (LCD), Plasma and the like, while player 122 may be part of a separate set-top set, and other user input device 126 may be a separate remote control or keyboard. Similarly, for a desktop computer arrangement, player 122, display 124 and other input device(s) 126 may all be separate stand alone units. On the other hand, for a tablet arrangement, display 124 may be a touch sensitive display screen that includes other user input device(s) 126, and player 122 may be a computing platform with a soft keyboard that also include one of the user input device(s) 126. Further, display 124 and player 122 may be integrated within a single form factor. Similarly, for a smartphone arrangement, player 122, display 124 and other input device(s) 126 may be likewise integrated.

Figure 2:
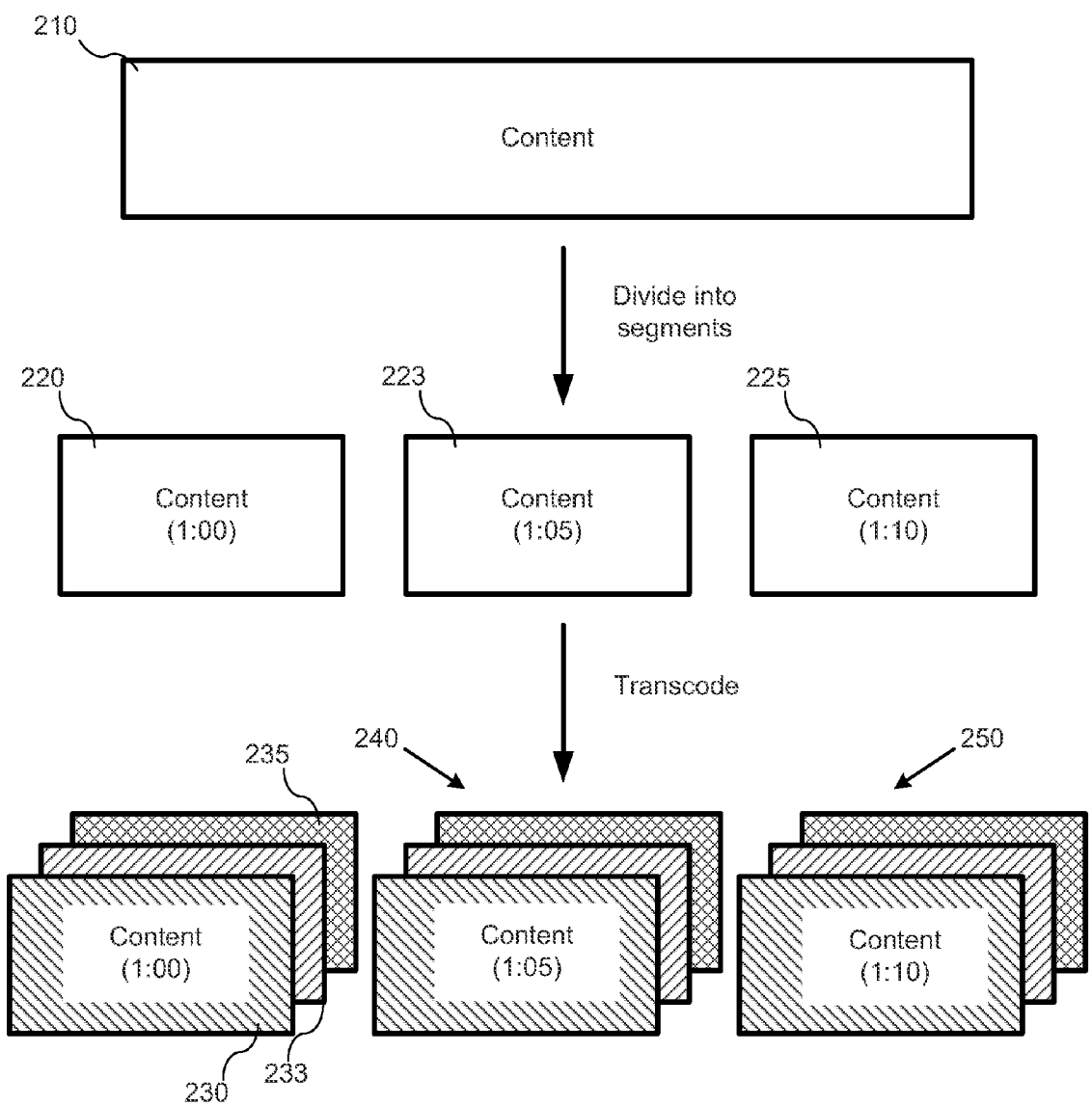
FIG. 2 illustrates examples of segmentation and transcoding of content, in accordance with various embodiments.

FIG. 2 illustrates examples of segmentation and transcoding of content, in accordance with various embodiments. As illustrated in FIG. 2, content 210 may be received by the encoder 112 of the content aggregation/distribution server 104. In various embodiments, the content 210 may then be divided into segments, such as by the encoder 112. In various embodiments, the contents may be divided on a time basis. For example, as illustrated in FIG. 2, the content 210 is divided into five-second segments 220, 223, and 225. In some embodiments, the content 210 may be partitioned into segments 220-225 such that the segments do not overlap; FIG. 2 illustrates an example of such partitioning. In other embodiments, the content may be divided such that some segments may overlap with respect to time. In various embodiments, this overlap may be created for various reasons. For example, in some embodiments, the content may include video and audio such that the video and audio do not natural divide at the same time points. One example of this may be video associated with certain types of enhanced audio encoded. In such embodiments, the segments may be divided with some degree of overlap such that, during subsequent transcoding, sufficient video and audio are present to transcode the video into a second video format.

Also, as illustrated, in various embodiments, the divided segments of video may be transcoded from the format it was received in to generate video encoded in one or more other formats. In various embodiments, each segment may be transcoded into multiple formats. In various embodiments, each segment may be transcoded into multiple bitrates for a single format. Thus, as the example of FIG. 2 illustrates, the segment 220 may be transcoded into multiple encoded segments 230, 233, and 235. Similarly, the sets of multiple encoded segments 240 and 250 may be created for the divided segments 223 and 225, respectively.

Figure 3:
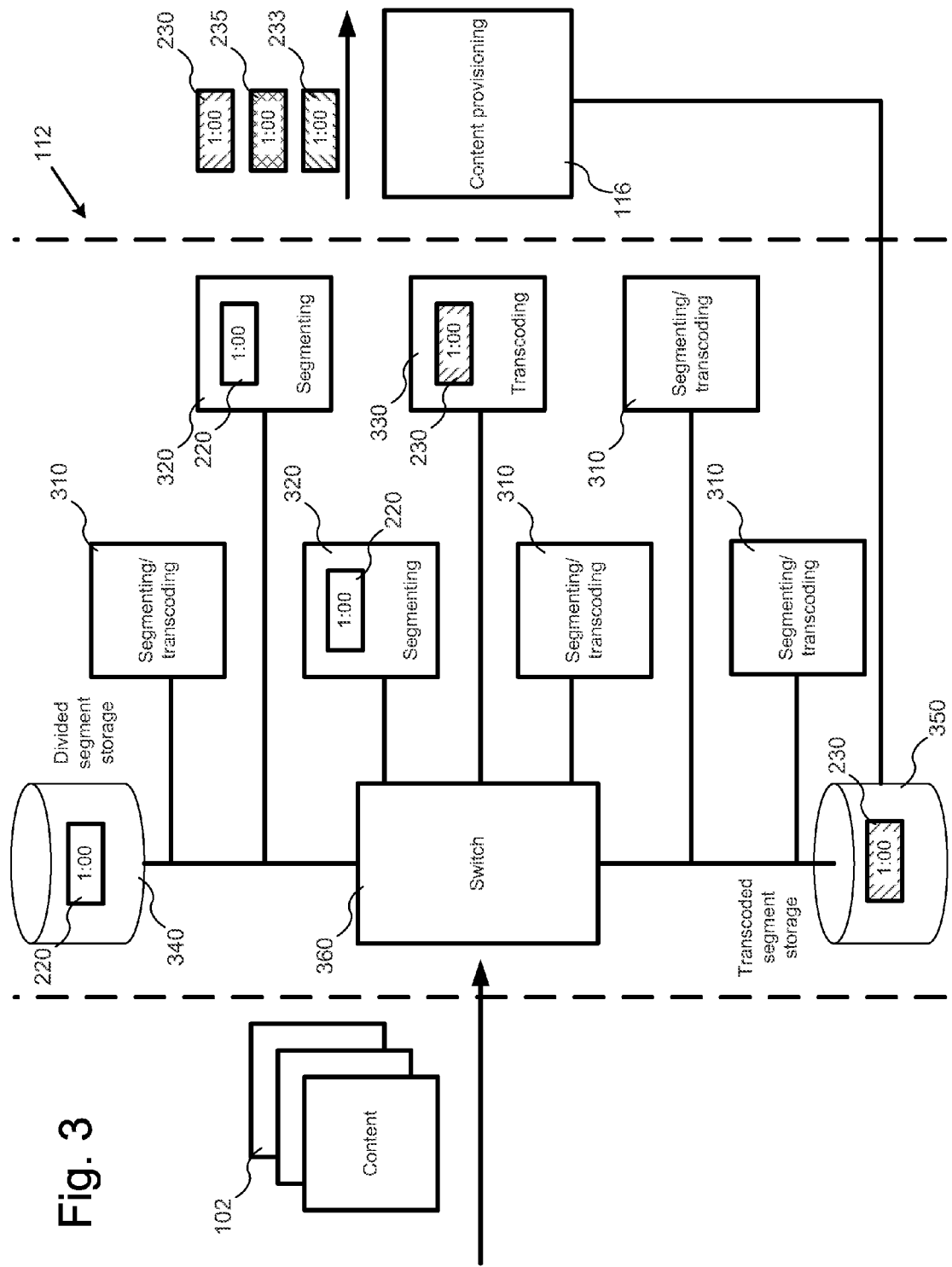
FIG. 3 illustrates an example arrangement for content encoding, in accordance with various embodiments.

FIG. 3 illustrates an example arrangement for content encoding, in accordance with various embodiments. In various embodiments, the components illustrated in FIG. 3 may be included in the encoder 112, which receives content 102 and provides transcoded segments of video and/or audio data to the content provisioning 116. In various embodiments, the encoder 112 may include one or more computing devices which may communicate with each other to coordinate dividing of the content 102 into segments of video and/or audio data and transcoding of the segments of video and/or audio data. In various embodiments, the encoder 112 may include one or more segmenting computing devices 320, which may be configured to divide the content 102 into segments. Thus, as illustrated in the example of FIG. 3, two of the segmenting computing devices have divided the content 102 to generate the segment 220. In various embodiments, the segmenting computing devices 320 may be configured such that a given segment is generated by more than one segmenting computing device 320. In various embodiments, the segmenting computing devices 320 may utilize this redundant generation of segments in order to improve reliability. This increased reliability may be useful when the content 102 is a video stream. In embodiments where the content is continually streaming to the encoder 112, the use of multiple segmenting computing devices 320 to generate segments may decrease the likelihood that any given segment of content is missed.

In various embodiments, the generated segments may be stored locally on the segmenting computing devices 320, as illustrated in the example segmenting computing devices 320 of FIG. 3, or may be stored on separate storage. For example, the encoder 112 may additionally include a divided segment storage 340 that may be configured to store the segments, such as segment 220, once they are generated by dividing the content 102.

In various embodiments, the encoder 112 may also include one or more transcoding computing devices 330, which may be configured to transcode the divided segments, such as segment 220, into different formats and/or bitrates. Thus, the illustrated example, transcoding computing device 330 has transcoded the segment 220 into the transcoded segment 230. In various embodiments, the transcoded segments may be stored locally on the segmenting computing devices 330, as illustrated in the example of FIG. 3, or may be stored on separate storage. For example, the encoder 112 may additionally include a transcoded segment storage 350 that may be configured to store the transcoded segments, such as segment 230, once they are generated by transcoding the segments, such as segment 220. In various embodiments, the storage transcoded segments, such as transcoded segment 230 may be streamed by content provisioning 116. Content provisioning 116 may thus stream, or otherwise provide multiple transcoded segments for presentation, such as transcoded segments 230, 233, and 235.

In various embodiments, the encoder 112 may include one or more segmenting/transcoding computing devices 310, which may be configured to perform both dividing of the content 102 and transcoding of segments. Thus, it may be recognized, that, in various embodiments, the computing devices used in encoder 112 may include one or more devices dedicated solely to segmenting, one or more devices dedicated solely to transcoding, and/or one or more devices that may perform both tasks.

In various embodiments, one or more of the computing devices and storage may be coupled to each other via a computing network. Thus, as illustrated, the one or more segmenting computing devices 320, one or more transcoding computing devices 330, and/or one or more segmenting/transcoding computing devices 310 may be interconnected, along with divided segment storage 340 and/or transcoded segment storage 350 via the computing network. The network may, in various embodiments, be mediated by a switch 360 or other network hardware. In various embodiments, the one or more segmenting/transcoding computing devices 310 may communicate using multicast communication techniques. In various embodiments, the one or more segmenting/transcoding computing devices 310 may communicate and/or transfer data between each other using http or other communication protocols. In various embodiments, the computing devices may be coupled to each other through the switch 360 in order that the computing devices may, on an individual basis, decide to perform segmenting and/or transcoding tasks. These decisions may be facilitated by indications made by the various computing devices of segmenting and/or transcoding tasks that have been performed or are currently being performed, to facilitate other devices in recognizing what tasks still remain to be performed. Thus, in various embodiments, the computing devices may operate autonomously to divide and transcode the content 102 without requiring coordination from a central device.

Figure 4:
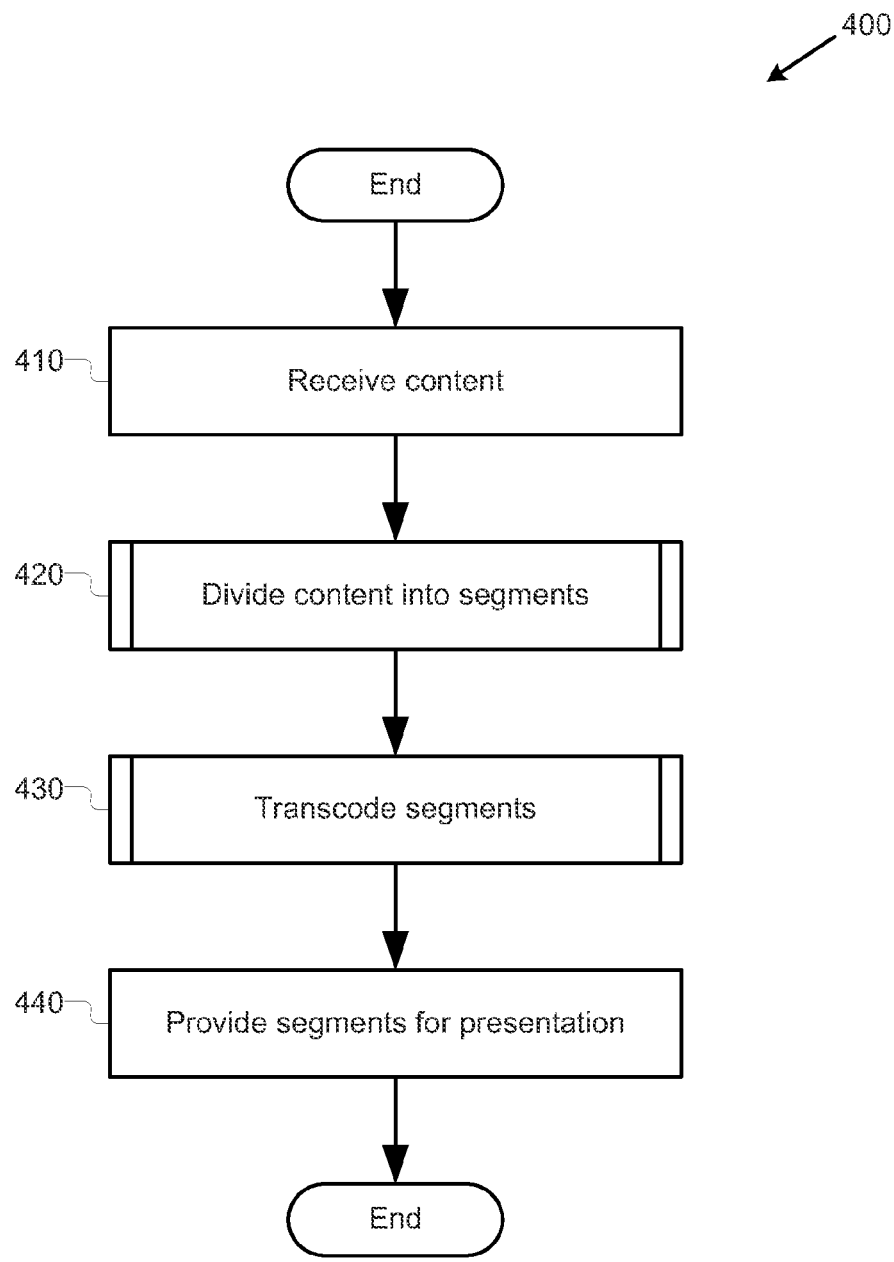
FIG. 4 illustrates an example process for creating transcoded content segments for presentation, in accordance with various embodiments.

FIG. 4 illustrates an example process 400 for creating transcoded content segments for presentation, in accordance with various embodiments. In various embodiments, process 400 may be performed by the encoder 112 in order to transcode the content 102 into transcoded segments for provisioning by the content provisioning 116. While FIG. 4 illustrates a particular ordering and division of operations, in various embodiments, one or more operations of process 400 may be re-ordered, combined, divided further, or omitted.

The process may begin at operation 410, where the encoder 112 may receive the content 102. In various embodiments, the content may be received as streamed content, such as a multicast stream. In other embodiments, the content may be received as a discrete piece of content. Next, at operation 420, the encoder 112 may divide the content into segments, such as through actions of the segmenting computing devices 320 and/or segmenting/transcoding computing devices 310. Examples of embodiments of operation 420 are described below with reference to process 500 of FIG. 5. Next, at operation 430, the encoder 112 may transcode the segments, such as through actions of the transcoding computing devices 330 and/or segmenting/transcoding computing devices 310. Examples of embodiments of operation 430 are described below with reference to process 600 of FIG. 6. Next, at operation 440, the encoder 112 and/or the content provisioning 116 may provide the transcoded segments for presentation. The process may then end.

Figure 5:
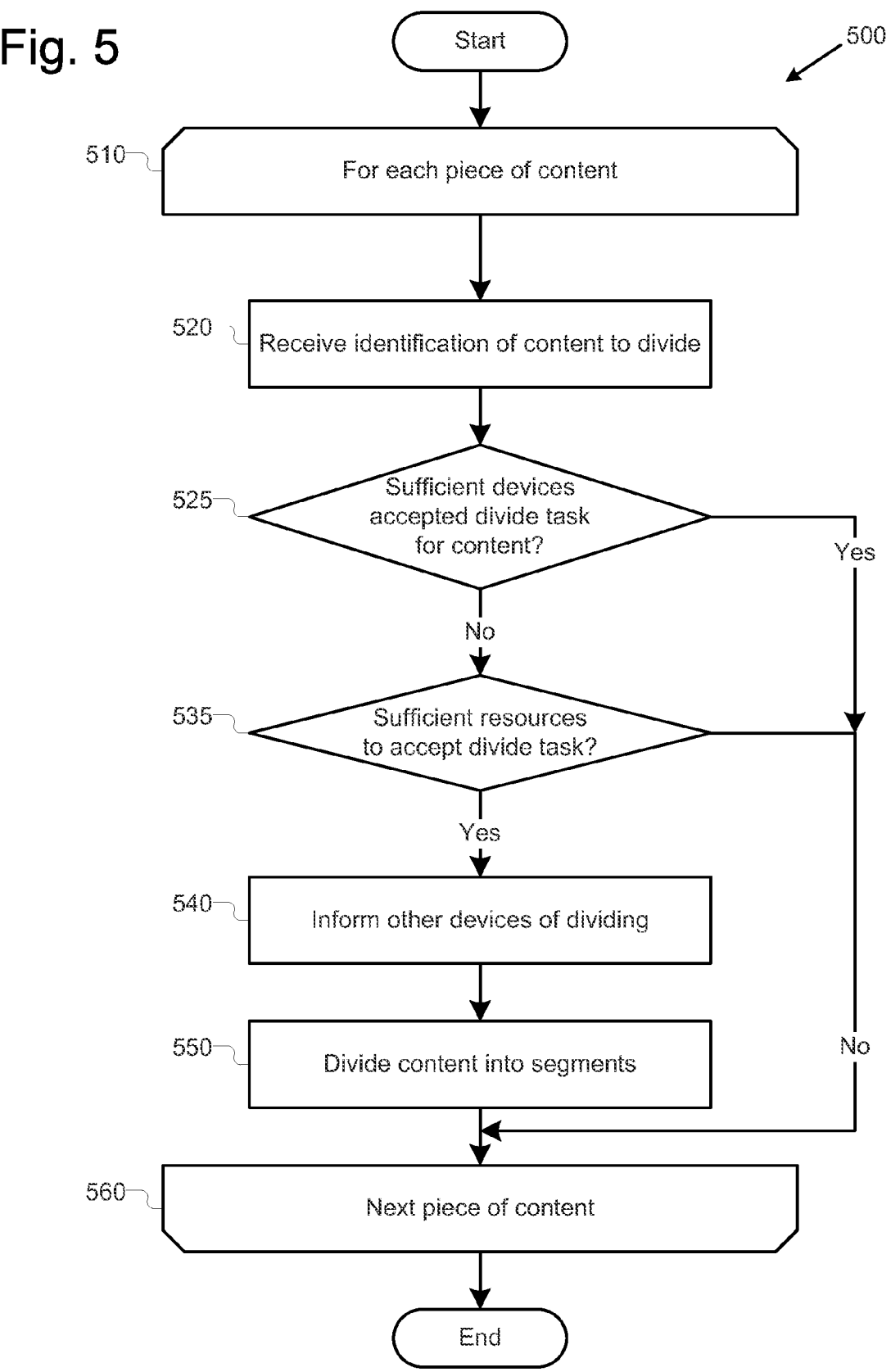
FIG. 5 illustrates an example process for dividing content into segments, in accordance with various embodiments.

FIG. 5 illustrates an example process for dividing content into segments, in accordance with various embodiments. In various embodiments, process 500 may be performed by the encoder 112, and in particular by the segmenting computing devices 320 and/or segmenting/transcoding computing devices 310, in order to divide the content 102 into segments for transcoding. While FIG. 5 illustrates a particular ordering an division of operations, in various embodiments, one or more operations of process 500 may be re-ordered, combined, divided further, or omitted.

The process may begin at loop operation 510, where a loop may begin for each piece of content. In various embodiments, the pieces of content may include continuous streams as well as discrete pieces of content. At operation 520, a segmenting computing device 320 or segmenting/transcoding computing device 310 may receive an identification of content to divide. In various embodiments, the segmenting computing device 320 or segmenting/transcoding computing device 310 may receive the identification through reading of a local or remote configuration file with channel and/or content information. Next, at decision operation 525, the segmenting computing device 320 or segmenting/transcoding computing device 310 may determine if there are sufficient devices that have accepted a divide task for the piece of content. In various embodiments, the segmenting computing device 320 or segmenting/transcoding computing device 310 may determine whether sufficient devices have accepted the dividing task based on one more indications that have received from other segmenting computing devices 320 or segmenting/transcoding computing devices 310. Thus, in some embodiments, if two or more segmenting computing devices 320 or segmenting/transcoding computing devices 310 have indicated that they have or will divide the piece of content, then the current segmenting computing device 320 or segmenting/transcoding computing device 310 may determine that there are sufficient devices performing the dividing task. If so, then process 500 may proceed to loop operation 510, where the loop may repeat for a new piece of content.

However, in various embodiments, if only one segmenting computing device 320 or segmenting/transcoding computing device 310 is performing the divide task, or if none are, then the process may continue to decision operation 535, where the segmenting computing device 320 or segmenting/transcoding computing device 310 may determine if it currently has sufficient resources available to perform the divide task. If not, then the process may proceed to loop operation 560, where the loop may repeat for a new piece of content.

If, however, the segmenting computing device 320 or segmenting/transcoding computing device 310 determines at decision operation 535 that it does have sufficient resources, then at operation 540, the segmenting computing device 320 or segmenting/transcoding computing device 310 may inform the other computing devices in the encoder 112 that it will divide the piece of content. Next, at operation 550, the segmenting computing device 320 or segmenting/transcoding computing device 310 may divide the piece of content into segments. As discussed above, in various embodiments, at operation 550 the segmenting computing device 320 or segmenting/transcoding computing device 310 may partition the piece of content into non-overlapping and/or overlapping segments. The process may then repeat at loop 560 for the next piece of content. If no more content is received, then the process may end.

Figure 6:
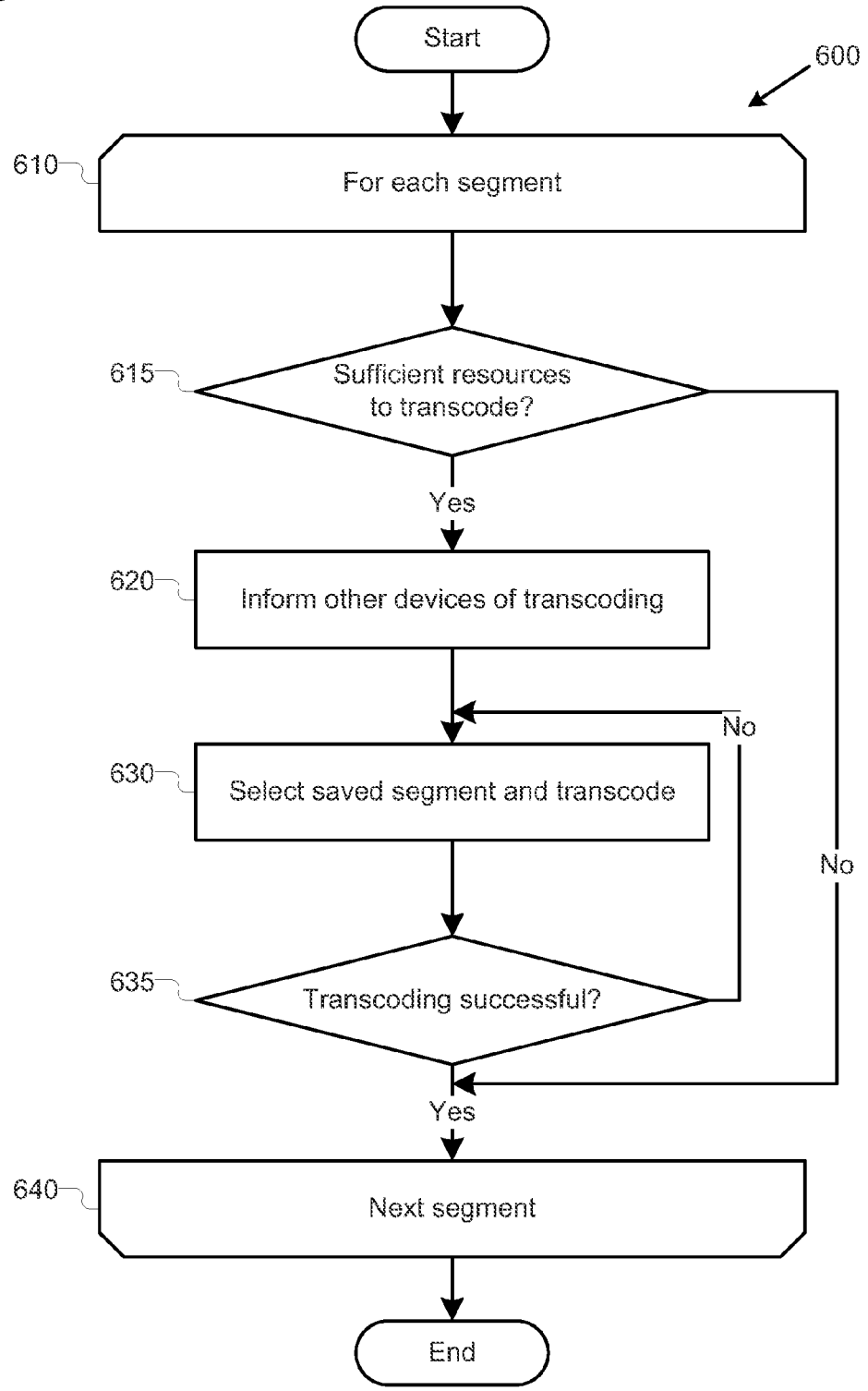
FIG. 6 illustrates an example process for transcoding divided content segments for presentation, in accordance with various embodiments.

FIG. 6 illustrates an example process for transcoding divided content segments for presentation, in accordance with various embodiments. In various embodiments, process 600 may be performed by the encoder 112, and in particular by the transcoding computing devices 330 and/or segmenting/transcoding computing devices 310, in order to transcode segments. While FIG. 6 illustrates a particular ordering and division of operations, in various embodiments, one or more operations of process 600 may be re-ordered, combined, divided further, or omitted. The process may begin at loop operation 610, where a loop may begin for each divided segment of content. In various embodiments, a transcoding computing device 330 or segmenting/transcoding computing device 310 may become aware of a segment for transcoding by receiving an indication of a completed segmenting task performed by a segmenting computing device 320 or segmenting/transcoding computing device 310. At decision operation 615 a transcoding computing device 330 or segmenting/transcoding computing device 310 may determine if it has sufficient resources to transcode the segment. If the transcoding computing device 330 or segmenting/transcoding computing device 310 does not currently have sufficient resources, then process 600 may proceed to loop operation 640 and repeat the loop with the next piece of content.

If, however, the transcoding computing device 330 or segmenting/transcoding computing device 310 does have sufficient resources, then at operation 620, the transcoding computing device 330 or segmenting/transcoding computing device 310 may inform the other transcoding computing devices 330 and/or segmenting/transcoding computing devices 310 that it will transcode the segment. Next, at operation 630, the transcoding computing device 330 or segmenting/transcoding computing device 310 may select a segment and transcode the segment. In various embodiments, the transcoding computing device 330 or segmenting/transcoding computing device 310 may perform multiple transcoding operations at operation 630 in order to transcode the segment into multiple formats and/or bitrates. Next, at decision operation 635, the transcoding computing device 330 or segmenting/transcoding computing device 310 may determine if the one or more transcoding operations were successful. If not then process 600 may return to operation 630 where the transcoding computing device 330 or segmenting/transcoding computing device 310 may select and transcode the segment again. In some embodiments, the transcoding computing device 330 or segmenting/transcoding computing device 310 may select a different copy of the segment than the one for which transcoding was previously attempted; in other embodiments, the same copy may be used for the transcoding. Once the transcoding is successful, then at loop operation 640, the process may repeat for the next segment. If no more segments are available for transcoding, the process may then end.

Figure 7:
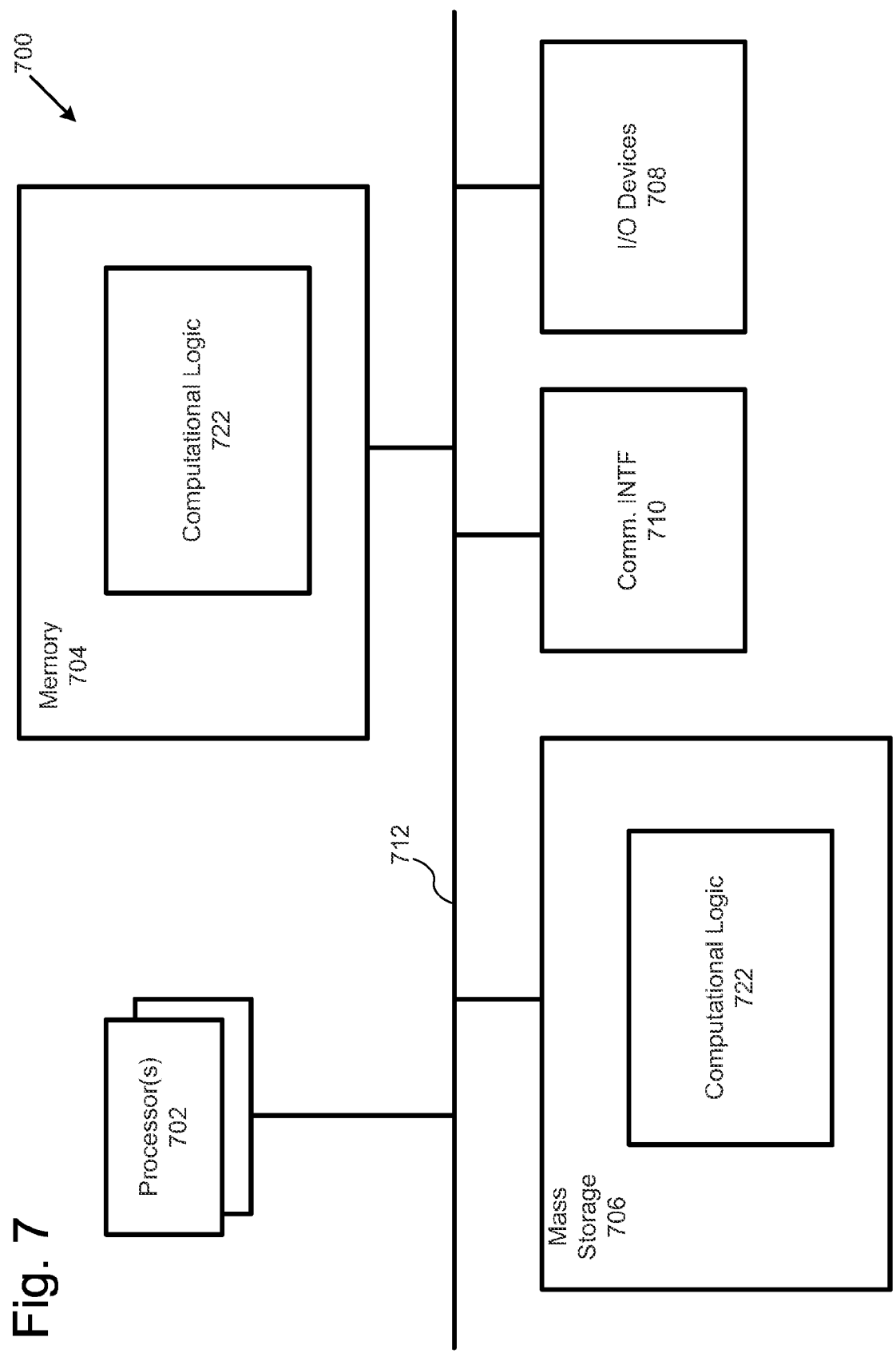
FIG. 7 illustrates an example computing environment suitable for practicing the disclosure, in accordance with various embodiments.

Referring now to FIG. 7, an example computer suitable for use for the arrangement of FIGS. 1 and 3, in accordance with various embodiments, is illustrated. As shown, computer 700 may include one or more processors or processor cores 702, and system memory 704. For the purpose of this application, including the claims, the terms "processor" and "processor cores" may be considered synonymous, unless the context clearly requires otherwise. Additionally, computer 700 may include mass storage devices 706 (such as diskette, hard drive, compact disc read only memory (CD-ROM) and so forth), input/output devices 708 (such as display, keyboard, cursor control and so forth) and communication interfaces 710 (such as network interface cards, modems and so forth). The elements may be coupled to each other via system bus 712, which may represent one or more buses. In the case of multiple buses, they may be bridged by one or more bus bridges (not shown).

Each of these elements may perform its conventional functions known in the art. In particular, system memory 704 and mass storage devices 706 may be employed to store a working copy and a permanent copy of the programming instructions implementing the operations associated with content aggregation/distribution servers 104, e.g., the segmenting and/or encoding operations as earlier described. The various elements may be implemented by assembler instructions supported by processor(s) 702 or high-level languages, such as, for example, C, that can be compiled into such instructions.

The permanent copy of the programming instructions may be placed into permanent storage devices 706 in the factory, or in the field, through, for example, a distribution medium (not shown), such as a compact disc (CD), or through communication interface 710 (from a distribution server (not shown)). That is, one or more distribution media having an implementation of the agent program may be employed to distribute the agent and program various computing devices.

The number, capability and/or capacity of these elements 710-712 may vary, depending on whether computer 700 is used as a content aggregation/distribution server 104 or a content consumption device 708. Their constitutions are otherwise known, and accordingly will not be further described.

Figure 8:
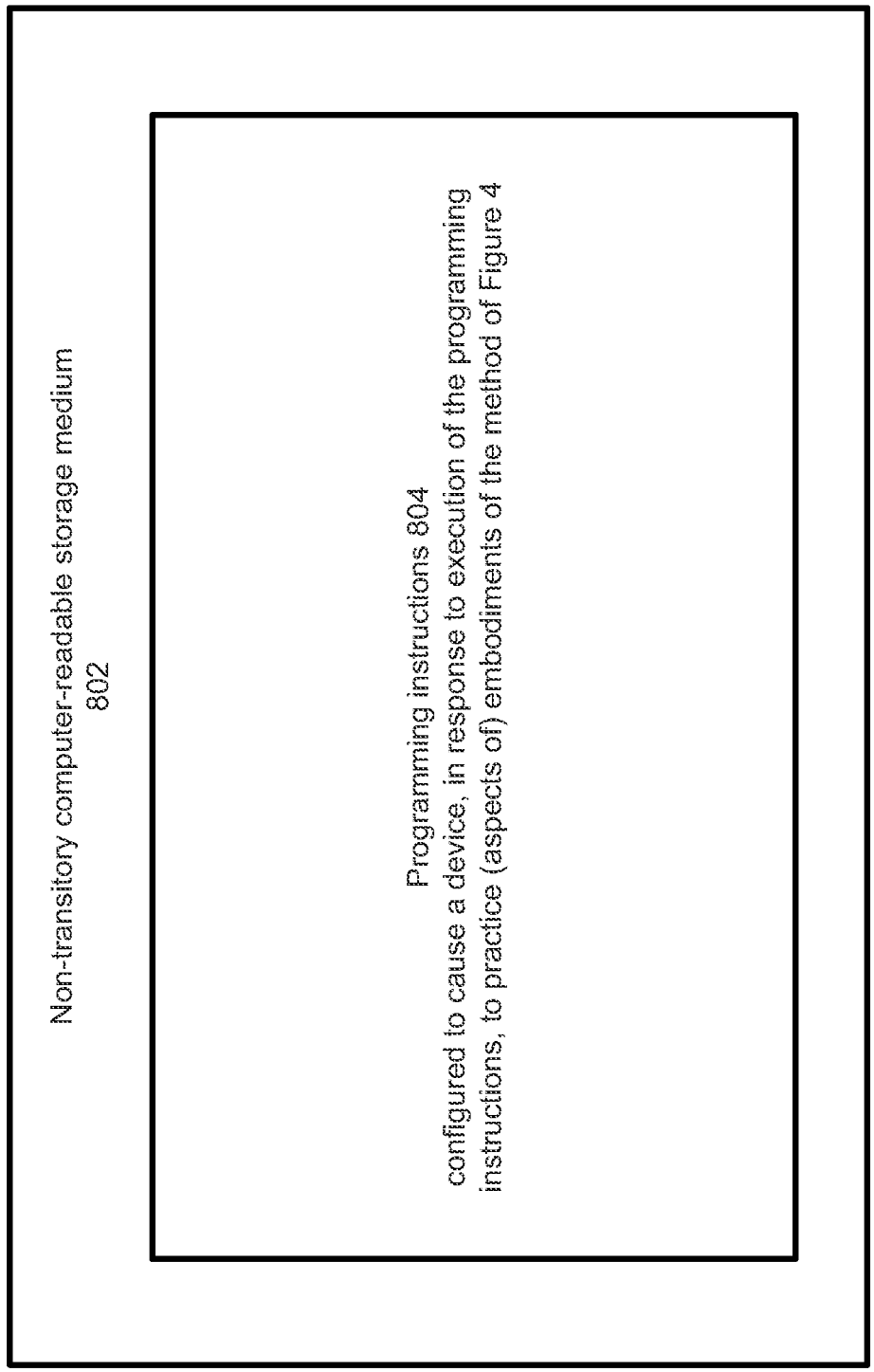
FIG. 8 illustrates an example storage medium with instructions configured to enable an apparatus to practice the present disclosure, in accordance with various embodiments.

FIG. 8 illustrates an example non-transitory computer-readable storage medium having instructions configured to practice all or selected ones of the operations associated with content aggregation/distribution servers 104 or content consumption devices 108, earlier described; in accordance with various embodiments. As illustrated, non-transitory computer-readable storage medium 802 may include a number of programming instructions 804. Programming instructions 804 may be configured to enable a device, e.g., computer 700, in response to execution of the programming instructions, to perform, e.g., various operations of process 400, 500, 600 of FIGS. 4-6, e.g., but not limited to, to the various operations performed to segment and transcode received content. In alternate embodiments, programming instructions 804 may be disposed on multiple non-transitory computer-readable storage media 802 instead.

Referring back to FIG. 7, for one embodiment, at least one of processors 702 may be packaged together with computational logic 722 configured to practice aspects of the process of FIG. 4. For one embodiment, at least one of processors 702 may be packaged together with computational logic 722 configured to practice aspects of the process of FIG. 4 to form a System in Package (SiP). For one embodiment, at least one of processors 702 may be integrated on the same die with computational logic 722 configured to practice aspects of the process of FIG. 4. For one embodiment, at least one of processors 702 may be packaged together with computational logic 722 configured to practice aspects of the process of FIG. 4 to form a System on Chip (SoC). For at least one embodiment, the SoC may be utilized in, e.g., but not limited to, a computing tablet.

The following paragraphs describe examples of various embodiments. In various embodiments, a system for transcoding video and/or data may include one or more segmenting computing devices configured to divide the video and/or audio data and generate a plurality of segments of video and/or audio data, wherein the video and/or audio data is received in a first video format and the video and/or audio data segments remain in the first video format after dividing. The system may also include one or more transcoding computing devices coupled to the one or more segment computing devices and configured to transcode the segments of video and/or audio data in the first video format into a second video format.

In various embodiments, the video and/or audio data received in the first video format may include a multicast video stream. In various embodiments, the one or more segmenting computing devices may include M segmenting computing devices, and the one or more encoding computing devices may include N encoding computing devices, wherein M and N are integers and M is greater than N.

In various embodiments, the segmenting computing devices and the encoding computing devices may include a common set of computing devices. For at least one computing device of the common set of computing devices, the at least one computing devices may be configured to operate as both segmenting computing devices and transcoding computing devices. The one or more segmenting computing devices may include a plurality of segmenting computing devices, and at least one of the segmenting computing devices may be configured to receive indications from other segmenting computing devices as to segments of video and/or audio data that have been or will be generated and, for a potential segment of video and/or audio data, autonomously decide to generate the potential segment of video and/or audio data or to not generate the potential segment of video and/or audio data based at least in part on the received indications.

The at least one segmenting computing device may be configured to decide to generate the potential segment of video and/or audio data without receiving an assignment to generate the potential segment from an other segmenting computing device. The at least one segmenting computing device may be configured to decide to generate the potential segment of video and/or audio data when an other segmenting computing device is also generating the potential segment of video and/or audio data. The at least one segmenting computing device may be configured to decide to not generate the potential segment of video and/or audio data when two or more other segmenting computing devices have generated or are generating the potential segment of video and/or audio data.

In various embodiments one or more encoding computing devices may include a plurality of encoding computing devices, and at least one encoding computing device may be further configured to receive indications from other encoding computing devices as to segments of video and/or audio data that have been or will be encoded in the second video format and, for a segment of video and/or audio data, autonomously decide to encode the segment of video and/or audio data or to not encode the segment of video and/or audio data based on the received indications. The at least one encoding computing device may be configured to decide to not encode the segment of video and/or audio data when an other encoding computing device has encoded or is encoding segment of video and/or audio data.

In various embodiments, the segmenting computing devices may be configured to generate segments of video and/or audio data such that some generated segments of video and/or audio data overlap with relation to time. In various embodiments, the segmenting computing devices and the encoding computing devices may be configured to communicate with each other over a network. In various embodiments, the system may further include a storage coupled with one or more segment computing devices and one or more encoding computing devices, and configured to store the generated segments of video and/or audio data in the first format for access by one or more encoding computing devices.

In various embodiments, the system may further include a storage coupled with one or more segment computing devices and one or more encoding computing devices, and configured to store the transcoded segments of video and/or audio data in the second format for provisioning to one or more presentation devices. In various embodiments, the one or more transcoding computing devices may be configured to transcode the segments of video and/or audio data in a plurality of different formats and/or bitstreams.

Computer-readable media (including non-transitory computer-readable media), methods, apparatuses, systems and devices for performing the above-described techniques are illustrative examples of embodiments disclosed herein. Additionally, other devices in the above-described interactions may be configured to perform various disclosed techniques.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. A system for transcoding video or audio data, the system comprising:
    a plurality of segmenting computing devices configured to communicate and to transfer the video or audio data between one another,
    where the plurality of segmenting computing devices are configured to divide the video or audio data and generate a plurality of segments of video or audio data, wherein the video or audio data is received in a first video format and the video or audio data segments remain in the first video format after dividing, and
    wherein at least one segmenting computing device of the plurality of segmenting computing devices is configured to:
        receive indications from other segmenting computing devices, of the plurality of segmenting computing devices, as to segments of video or audio data that have been or will be generated;
        determine whether the other segmenting computing devices are sufficient to divide the video or audio data based on the received indications, and
        for a potential segment of video or audio data, autonomously determine whether to generate the potential segment of video or audio data based at least in part on the received indications; and
    one or more transcoding computing devices coupled to the plurality of segmenting computing devices and configured to transcode the segments of video or audio data in the first video format into a second video format.

2. The system of claim 1, wherein the video or audio data received in the first video format comprises a multicast video stream.

3. The system of claim 1, wherein the plurality of segmenting computing devices comprise M segmenting computing devices, and the one or more transcoding computing devices comprises N transcoding computing devices, wherein M and N are integers and M is greater than N.

4. The system of claim 1, wherein the plurality of segmenting computing devices and the one or more transcoding computing devices comprise a common set of computing devices.

5. The system of claim 4, wherein, for at least one computing device of the common set of computing devices, the at least one computing device is configured to operate as both a segmenting computing device and a transcoding computing device.

6. The system of claim 1, wherein the plurality of segmenting computing devices are configured to decide to generate the potential segment of video or audio data without receiving an assignment to generate the potential segment from an other segmenting computing device.

7. The system of claim 1, wherein the plurality of segmenting computing devices are configured to generate the potential segment of video or audio data when an other segmenting computing device is also generating the potential segment of video or audio data.

8. The system of claim 1, wherein the plurality of segmenting computing devices are configured to not generate the potential segment of video or audio data when two or more other segmenting computing devices have generated or are generating the potential segment of video or audio data.

9. The system of claim 1, wherein the one or more transcoding computing devices comprise a plurality of transcoding computing devices, and at least one transcoding computing device is further configured to:
    receive indications from other transcoding computing devices as to segments of video or audio data that have been or will be transcoded in the second video format; and
    for a segment of video or audio data, autonomously determine whether to transcode the segment of video or audio data based on the received indications.

10. The system of claim 9, wherein the at least one transcoding computing device is configured to not transcode the segment of video or audio data when an other transcoding computing device has transcoded or is transcoding the segment of video or audio data.

11. The system of claim 1, wherein the plurality of segmenting computing devices are configured to generate segments of video or audio data such that some generated segments of video or audio data overlap with relation to time.

12. The system of claim 1, wherein the plurality of segmenting computing devices and the one or more transcoding computing devices are configured to communicate with each other over a network.

13. The system of claim 1, further comprising a storage connected to the plurality of segmenting computing devices and the one or more transcoding computing devices, and configured to store the generated segments of video or audio data in the first format for access by the one or more transcoding computing devices.

14. The system of claim 1, further comprising a storage connected to the plurality of segmenting computing devices and the one or more transcoding computing devices, and configured to store the transcoded segments of video or audio data in the second format for provisioning to one or more presentation devices.

15. The system of claim 1, wherein the one or more transcoding computing devices are configured to transcode the segments of video or audio data in a plurality of different formats or bitstreams.

16. A computer-implemented method for transcoding video or audio data, the method comprising:
    dividing, by a plurality of computing devices, the video or audio data to generate a plurality of segments of video or audio data, wherein the video or audio data is received in a first video format and the video or audio data segments remain in the first video format after dividing, wherein dividing the video or audio data comprises:
        receiving, by individual computing devices of the plurality of computing devices, indications from other computing devices as to segments of video or audio data that have been or will be generated;
        determining, by the individual computing devices, whether the other computing devices are sufficient to divide the video or audio data based on the received indications; and
        for a potential segment of video or audio data, autonomously determining, by the individual computing devices, whether to generate the potential segment of video or audio data based at least in part on the received indications and without receiving an assignment to generate the potential segment from an other computing device; and
    transcoding, by the plurality of computing devices, the segments of video or audio data in the first video format into a second video format.

17. The computer-implemented method of claim 16, wherein for a generated segment of video content, generation of the segment of video content is performed by two of the plurality of computing devices.

18. The computer-implemented method of claim 16, wherein the dividing and the transcoding are each performed, at least in part, by a same computing device out of the plurality of computing devices.

19. The computer-implemented method of claim 16, wherein dividing the video or audio data comprises capturing video or audio data from a multicast video stream.

20. The computer-implemented method of claim 16, further comprising:
    not generating the potential segment of video or audio data in response to determining that two or more other computing devices have generated or are generating the potential segment of video or audio data.

21. The computer-implemented method of claim 16, wherein transcoding the segments of video or audio data comprises:
    receiving, by individual computing devices of the plurality of computing devices, indications from other computing devices as to segments of video or audio data that have been or will be transcoded in the second video format; and
    for a segment of video or audio data, autonomously transcode, by the individual computing devices, the segment of video or audio data based on the received indications and without receiving an assignment to transcode the segment from an other computing device.

22. The computer-implemented method of claim 21, further comprising:
    not transcoding the segment of video or audio data in response to determining that an other transcoding computing device has transcoded or is transcoding the segment of video or audio data.

23. One or more non-transitory computer-readable media containing instructions encoded thereon configured to, in response to execution by at least one computing device, cause the at least one computing device to:
    divide video or audio data to generate a plurality of segments of video or audio data, wherein the video or audio data is received in a first video format and the video or audio data segments remain in the first video format after dividing, wherein, when dividing the video or audio data, the one or more non-transitory computer-readable media cause the at least one computing device to:
        receive indications from other computing devices as to segments of video or audio data that have been or will be generated;
        determine whether the other computing devices are sufficient to divide the video or audio data and
        for a potential segment of video or audio data, autonomously determine whether to generate the potential segment of video or audio data based at least in part on the received indications and without receiving an assignment to generate the potential segment from an other computing device; and
    transcode segments of video or audio data in the first video format into a second video format.

24. The one or more computer-readable media of claim 23, wherein, when dividing the video or audio data, the one or more non-transitory computer-readable media cause the at least one computing device to capture video or audio data from a multicast video stream.

25. The one or more computer-readable media of claim 23, wherein the one or more non-transitory computer-readable media cause the at least one computing device to not generate the potential segment of video or audio data in response to determining that two or more other computing devices have generated or are generating the potential segment of video or audio data.

26. The one or more computer-readable media of claim 23, wherein, when transcoding the segments of video or audio data, the one or more non-transitory computer-readable media cause the at least one computing device to:

receive indications from other computing devices as to segments of video or audio data that have been or will be transcoded in the second video format; and for a segment of video or audio data, autonomously determine whether to transcode the segment of video or audio data based on the received indications and without receiving an assignment to transcode the segment from an other computing device.

27. The one or more computer-readable media of claim 26, wherein the one or more non-transitory computer-readable media cause the at least one computing device to not transcode the segment of video or audio data in response to determining that an other computing device has transcoded or is transcoding the segment of video or audio data.

\* \* \* \* \*